Oct. 12, 1954  A. R. DEAN  2,691,557
REPLACEABLE HUB AND AXLE ASSEMBLY FOR FARM IMPLEMENTS
Filed Sept. 11, 1950  2 Sheets-Sheet 1

Alfred R. Dean
INVENTOR.
BY
Attorneys

Oct. 12, 1954        A. R. DEAN        2,691,557
REPLACEABLE HUB AND AXLE ASSEMBLY FOR FARM IMPLEMENTS
Filed Sept. 11, 1950                    2 Sheets-Sheet 2
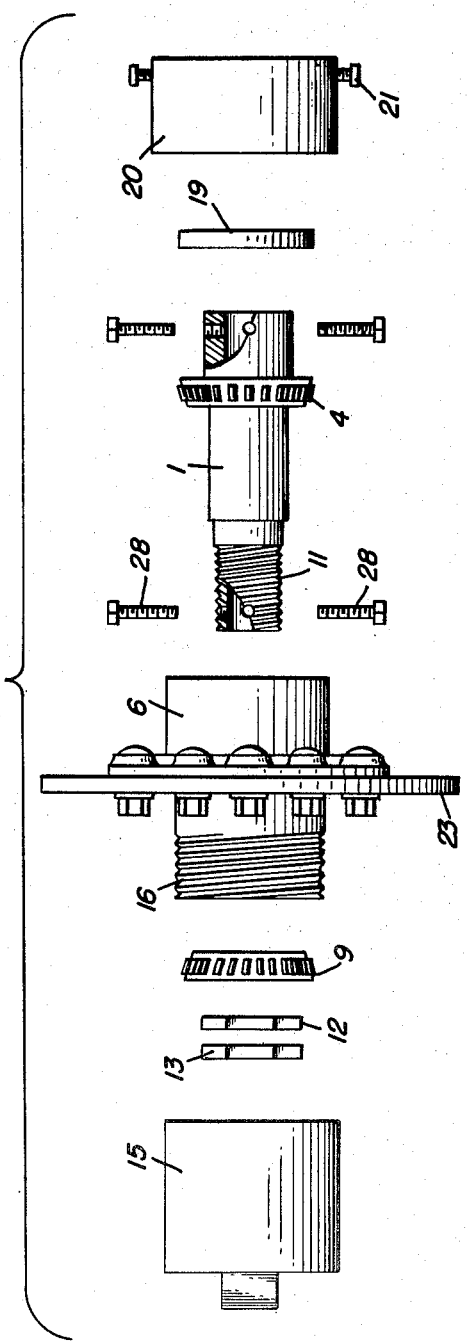
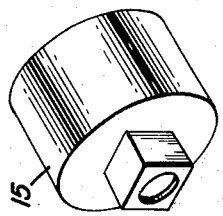
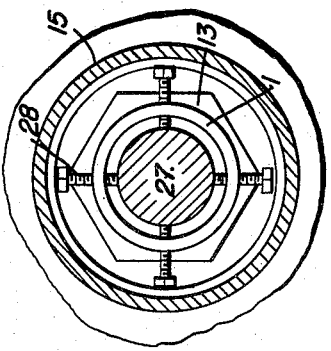
Alfred R. Dean
INVENTOR.

Patented Oct. 12, 1954

2,691,557

UNITED STATES PATENT OFFICE 2,691,557

REPLACEABLE HUB AND AXLE ASSEMBLY FOR FARM IMPLEMENTS

Alfred R. Dean, Amarillo, Tex.

Application September 11, 1950, Serial No. 184,322

1 Claim. (Cl. 308—211)

The present invention relates to new and useful improvements in replaceable hub and axle assemblies designed primarily for use with plows, harrows or other farm implements.

Many types of farm implements are equipped with plain or journal type bearings which frequently become worn and must be repaired at considerable cost and an object of the present invention is to provide a replaceable hub and axle assembly for use on such wheel bearings.

Another object is to provide a replaceable bearing assembly by means of which farm machinery may be converted from iron rimmed equipment to rubber tire equipment.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a group side elevational view thereof;

Figure 3 is a transverse sectional view taken on a line 3—3 of Figure 1;

Figure 4 is a perspective view of the cover cap; and

Figure 5 is a perspective view of the dust shield.

Figure 1:
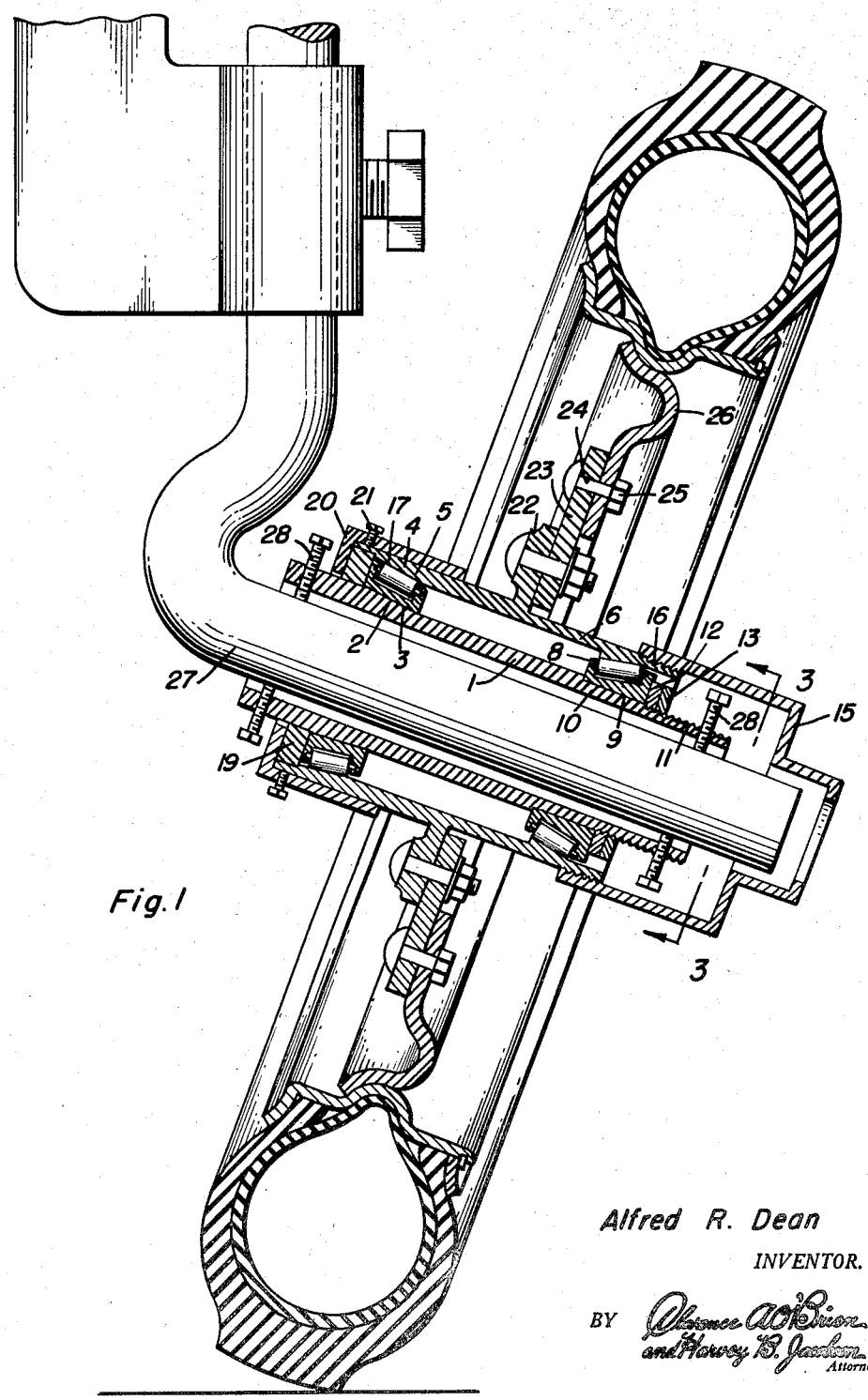
Figure 1 is a longitudinal sectional view of the bearing assembly.

Referring now to the drawings in detail, wherein for the purpose of illustration I have disclosed a preferred embodiment of my invention, the numeral 1 designates a hollow sleeve with an inner sloping shoulder 2 against which an inner bearing race 3 rests. A roller bearing 4 rides on the inner bearing race 3 and within a sloping bearing race 5 on the inside of the inner end of a hub 6.

In the outer end of the hub is a second bearing assembly 8 similarly positioned between the axle 1 and hub 6.

Bearing assembly 8 fits on axle 1 inwardly of its threaded outer end 11 and nuts 12 and 13 hold the bearing 8 in position and provides adjustment for the two bearings. A cap 15 is threaded on the threaded outer end 16 of the hub 6.

A grease retainer 19 is fitted in the inner end of hub 6 and a dust shield 20 is secured over the inner end of the hub by set screws 21.

The hub 6 includes a central flange 22 to which a circular plate or ring 23 is riveted or bolted. The circular plate has openings 24 to accommodate standard car or truck lug bolts 25 for attaching a wheel 26 thereto.

The hollow sleeve 1 is secured on a stub shaft or axle 27 of a farm implement by set screws 28, or may be spot welded or otherwise suitably secured thereto.

The replaceable assembly composed of axle 1 and hub 6 may be easily and quickly mounted in position on a worn stub shaft or axle 27 without changes or alterations in the construction thereof to thus save the expense of replacing the same.

Having described the invention, what is claimed as new is:

In combination with an axle, a sleeve surrounding the axle, set screws threaded through the ends of said sleeve securing the same to the axle, one end of said sleeve being of reduced diameter and threaded for a portion of its length and the other end of said sleeve being of greater diameter than the intermediate portion of said sleeve, the junction of the intermediate portion of said sleeve and the threaded end thereof constituting an annular shoulder, the junction of the intermediate portion of the sleeve and the other end thereof constituting a frusto-conical bearing seat, a hub concentrically surrounding said sleeve, the inner surface of said hub having oppositely sloped frusto-conical bearing races at each end, bearings seated on said reduced end portion and said frusto-conical bearing seat of said sleeve and engaging the hub bearing races, a nut threaded on the reduced end of said sleeve and retaining the hub thereon by pressing the bearings into engagement with the bearing races, said sleeve being spaced from said axle by said set screws for adjustment laterally of the axle by said set screws to correspondingly adjust said hub.

References Cited in the file of this patent

UNITED STATES PATENTS

| Number | Name | Date |
|---|---|---|
| 775,875 | Villatte | Nov. 22, 1904 |
| 1,180,662 | Lamar | Apr. 25, 1916 |
| 1,257,893 | Lee | Feb. 26, 1918 |
| 1,611,255 | Sturtevant | Dec. 21, 1926 |
| 1,834,501 | Smelik | Dec. 1, 1931 |
| 2,048,972 | Scheffler | July 28, 1936 |
| 2,419,691 | Shafer | Apr. 29, 1947 |
| 2,474,283 | Simpkins | June 28, 1949 |